United States Patent
Inagawa

(10) Patent No.: US 10,989,608 B2
(45) Date of Patent: Apr. 27, 2021

(54) TEMPERATURE SENSOR

(71) Applicant: DENSO CORPORATION, Kariya (JP)

(72) Inventor: Tsuyoshi Inagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 208 days.

(21) Appl. No.: 16/019,949

(22) Filed: Jun. 27, 2018

(65) Prior Publication Data

US 2019/0003899 A1   Jan. 3, 2019

(30) Foreign Application Priority Data

Jun. 28, 2017 (JP) .............................. JP2017-126754

(51) Int. Cl.
| G01K 7/00 | (2006.01) |
| G01K 7/22 | (2006.01) |
| G01K 1/08 | (2021.01) |
| G01K 1/16 | (2006.01) |
| G01K 7/02 | (2021.01) |

(52) U.S. Cl.
CPC ................. *G01K 7/22* (2013.01); *G01K 1/08* (2013.01); *G01K 1/16* (2013.01); *G01K 7/021* (2013.01)

(58) Field of Classification Search
CPC combination set(s) only.
See application file for complete search history.

(56) References Cited

U.S. PATENT DOCUMENTS

| 4,734,129 A * | 3/1988 | Knight .................... C22B 7/001 266/226 |
| 2008/0232428 A1* | 9/2008 | Ripley .................... G01K 1/08 374/208 |
| 2009/0296781 A1 | 12/2009 | Weber et al. |
| 2009/0323765 A1* | 12/2009 | Yokoi ...................... G01K 7/22 374/185 |
| 2011/0218445 A1* | 9/2011 | Braun ................. A61B 5/0084 600/478 |
| 2012/0027046 A1* | 2/2012 | Lee .......................... G01K 1/08 374/208 |

FOREIGN PATENT DOCUMENTS

| JP | 2008-261789 | 10/2008 |
| JP | 2009-115789 | 5/2009 |
| JP | 2009-192424 | 8/2009 |
| JP | 2010-230610 | 10/2010 |
| JP | 2012-242208 | 12/2012 |
| JP | 2013-137232 | 7/2013 |
| JP | 2016-151450 | 8/2016 |
| WO | 2013/072961 A1 | 5/2013 |

* cited by examiner

*Primary Examiner* — Lisa M Caputo
*Assistant Examiner* — Nasir U. Ahmed
(74) *Attorney, Agent, or Firm* — Nixon & Vanderhye PC

(57) ABSTRACT

A temperature sensor includes: a housing; a connector disposed in the housing; a cover attached to the housing; a temperature sensing part disposed in a tip end portion in the cover, detecting temperature; a pair of lead wires having conductivity, connected to the temperature sensing part and a terminal of the connector; a guide tube having insulation properties, formed to have larger inner diameter than an outer diameter of each lead wire, the guide tube having a gap between each lead wire and the guide tube to cover each lead wire; a filler that directly or indirectly touches the temperature sensing part and a tip end of the guide tube, a tip end region inside the cover being filled with the filler; a space formed in a base end side in a region filled with the filler within the cover.

15 Claims, 17 Drawing Sheets

TEMPERATURE SENSOR

CROSS-REFERENCE TO RELATED APPLICATION

This application is based on and claims the benefit of priority from earlier Japanese Patent Application No. 2017-126754 filed Jun. 28, 2017, the description of which is incorporated herein by reference.

BACKGROUND

Technical Field

The present disclosure relates to a temperature sensor that detects a temperature of an object to be measured.

Description of the Related Art

The temperature sensor is disposed in a pipe of an internal combustion engine of a vehicle, such as an exhaust pipe, an intake pipe, an intake-exhaust mixing pipe for exhaust gas recycling (EGR) and used for detecting temperature of fluid flowing through the pipe. The temperature sensor is configured such that a temperature sensing part in which electrical resistance or electromotive force changes depending on the temperature is covered by a cover, and a pair of lead wires lead out from the sensing part are connected to a terminal of a connector. In the temperature sensor device, an insulation tube is commonly used. The insulation tube guides a position of the pair of lead wires so as to avoid unnecessary touching between the pair of lead wires lead out from the sensing part. For example, Japanese patent application laid-open publication Number 2009-192424 discloses a temperature sensor in which each of a pair of electrode lines connected to the temperature sensing element is provided in a protection tube, and a part of the temperature sensing element and the protection tube are fixed by a coating material. The coating material is sucked into a portion between the protection tubes using capillary phenomenon.

A temperature is detected at a portion in a vicinity of the temperature sensing part in the tip end portion of the temperature sensor. Hence, when the heat capacity is low at the portion in a vicinity of the temperature sensing part, heat is likely to transfer to the temperature sensing part from a fluid as an object from which the temperature is detected. Accordingly, by setting the heat capacity to be smaller, responsiveness of the temperature sensor is enhanced. For this reason, to improve the responsiveness of the temperature sensor, the tip end portion of the temperature sensor can be small in its diameter. In this case, a pair of lead wires are required to be smaller in their diameter as well. At this time, the connecting portion between the pair of lead wires and the connector terminal becomes weak against the vibration applied to the connecting portion. Therefore, it is required to strengthen the connecting portion between the pair of lead wires and the connector terminal.

The pair of lead wires are provided to bridge across the temperature sensing part and the connector terminal. When the temperature sensor receives vibration, if the vibration frequency applied to the temperature sensor coincides the natural frequency of the pair of lead wires, there is a risk that the pair of lead wires may significantly vibrate. In this case, a large stress is applied to the connecting portion between the pair of lead wires and the connector terminal so that it is difficult to protect the connection portion from this stress.

According to the temperature sensor of the above-mentioned patent literature, protection tubes provided in the tip end portion of the pair of electrode lines are fixed to the temperature detection element by a coating material. Hence, even though the protection tubes are fixed to the temperature detection element, the connecting portion between the pair of electrode lines and the connector cannot be protected from the resonance of the pair of electrode lines.

To protect the pair of lead wires from resonance, a filler may be filled into the whole gap inside the cover, thereby fixing the pair of lead wires to avoid vibration. However, in this case, the heat capacity at a temperature detecting portion in the temperature sensor increases so that the responsiveness of the temperature sensor may deteriorate.

SUMMARY

Hence, it is desired to provide a temperature sensor having high responsiveness, capable of improving durability against vibration.

A first aspect of the present disclosure is a temperature sensor including: a housing; a connector disposed in the housing; a cover attached to the housing; a temperature sensing part disposed in a tip end portion in the cover, detecting temperature; a pair of lead wires having conductivity, connected to the temperature sensing part and a terminal of the connector; a guide tube having insulation properties, formed to have larger inner diameter than an outer diameter of each lead wire, the guide tube having a gap between each lead wire and the guide tube to cover each lead wire; a filler that directly or indirectly touches the temperature sensing part and a tip end of the guide tube, a tip end region inside the cover being filled with the filler; a space formed in a base end side in a region filled with the filler within the cover.

According to the temperature sensor of the first aspect, the guide tube reduces resonance of pair of lead wires, even when the temperature sensor is disposed under an environment where vibrations frequently occur. Specifically, the pair of lead wires are covered by the guide tube and a gap is formed between reach lead wire and the guide tube, in which the gap allows the lead wires to vibrate in the guide tube. Also, the temperature sensing part and the tip end of the guide tube are fixed to the tip end region in the cover with the filler. A space is formed in a base end side in a region filled with the filler within the cover.

According to these configurations, the pair of lead wires and the guide tube vibrate within the space when the temperature sensor receives vibrations. When the vibration frequency applied to the temperature sensor coincides the natural frequency of the pair of lead wires, and the pair of lead wires cause resonance, a pair of lead wires can be prevented from being resonated because of the following reasons.

The pair of lead wires are configured as a conductor having electrical conductivity and the guide tube is configured as a tube having insulation properties. The mass and rigidity of both lead wires and guide tube are different and also both natural frequencies are different. When vibration is applied to the pair of lead wires and the guide tube, if the vibration frequency overlaps the natural frequency of the pair of lead wires, the pair of lead wires significantly swing due to the resonance phenomena. At this moment, since the gap is formed between the pair of lead wires and the guide tube, the guide tube does not vibrate together with the pair of lead wires. Also, when the pair of lead wires resonate, the guide tube does not resonate.

Thus, the guide tube avoids vibration of the lead wires cause by resonance. That is, vibration of the pair of lead wires cause by the resonance is limited to vibration within a guide tube. Therefore, because of presence of the guide tube, resonance of the pair of lead wires is avoided and a stress applied to the connecting portion between the pair of lead wires and the terminal can be reduced. As a result, durability against vibration can be improved.

Moreover, space is formed in a base end side in a region filled with the filler within the cover, whereby the heat capacity of the temperature sensor in the cover can be smaller, and heat transfer can be reduced towards the base end side where housing or the like is provided. Thus, response of the temperature sensor when detecting the temperature can be maintained to be high.

Therefore, according to a temperature sensor of the first aspect of the present disclosure, durability can be improved against vibrations while maintaining high responsiveness.

Note that a sealing glass or a protective film, which will be described later will be described later, may be provided in the most outer shell part of the temperature sensing part. In this case, the filler does not touch the temperature sensing part directly, but touches indirectly. It should be noted that the bracketed reference signs of individual means in this column and in the claims indicate correspondence to specific means in the embodiments described later.

DETAILED DESCRIPTION OF THE PREFERRED EMBODIMENTS

With reference to the drawings, embodiments of the above-mentioned temperature sensor will be described.

First Embodiment

Figure 1:
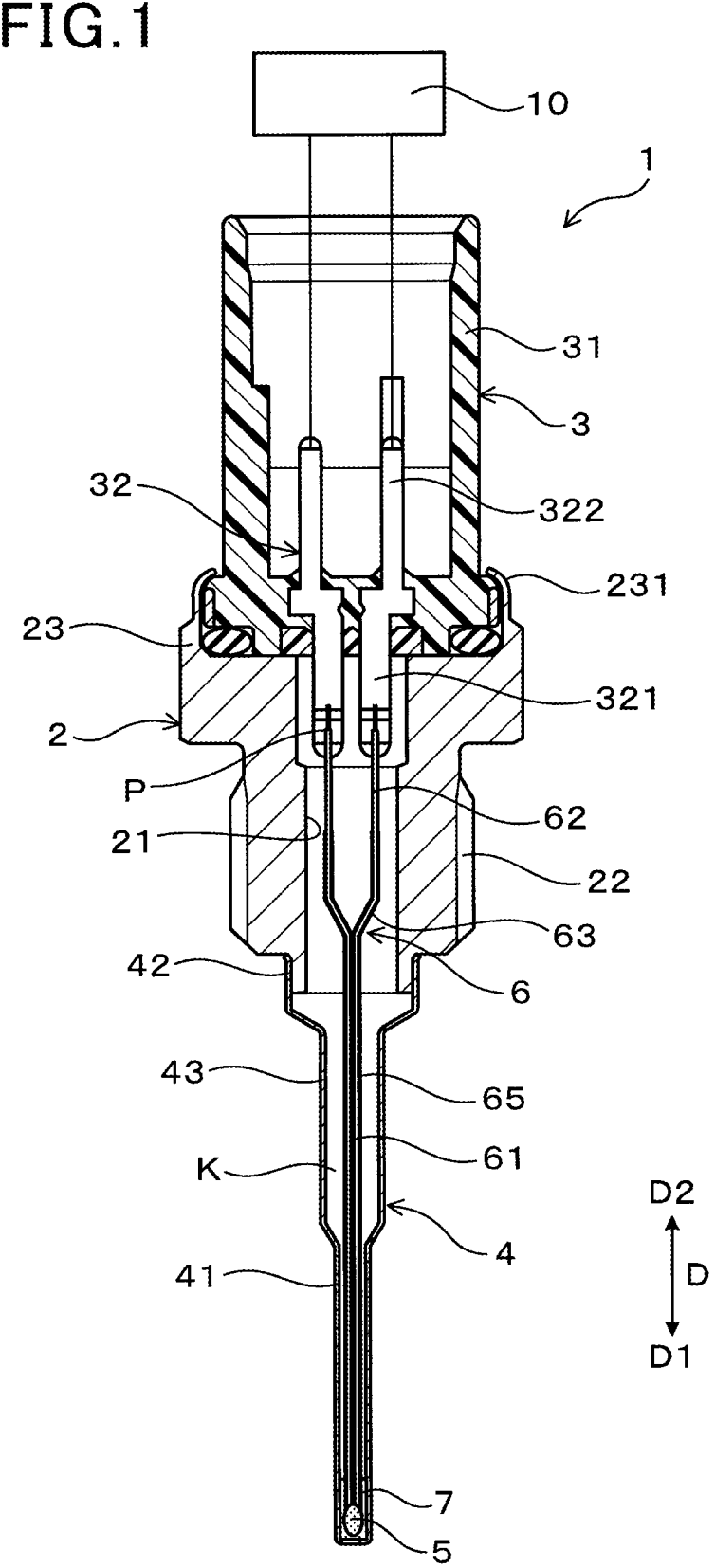
FIG. 1 is a cross-sectional view illustrating a temperature sensor according to a first embodiment of the present disclosure.

As shown in FIG. 1, a temperature sensor 1 according to the first embodiment includes a housing 2, a connector 3, a cover 4, a temperature sensing element 5 as a temperature sensing element 5, a pair of lead wires 6, a guide tube 65, a filler 7 and a space K. The housing 2 is attached to a pipe or the like. The connector 3 is used for electrical wiring and disposed in the housing 2. The cover 4 is attached to a tip end D1 of the housing. The temperature sensing element 5 is positioned in a tip end region in the cover 4, where the electrical resistance changes depending on the temperature. The pair of lead wires 6 has an electrical conductivity and connected to the terminal 32 of the connector 3.

Figure 2:
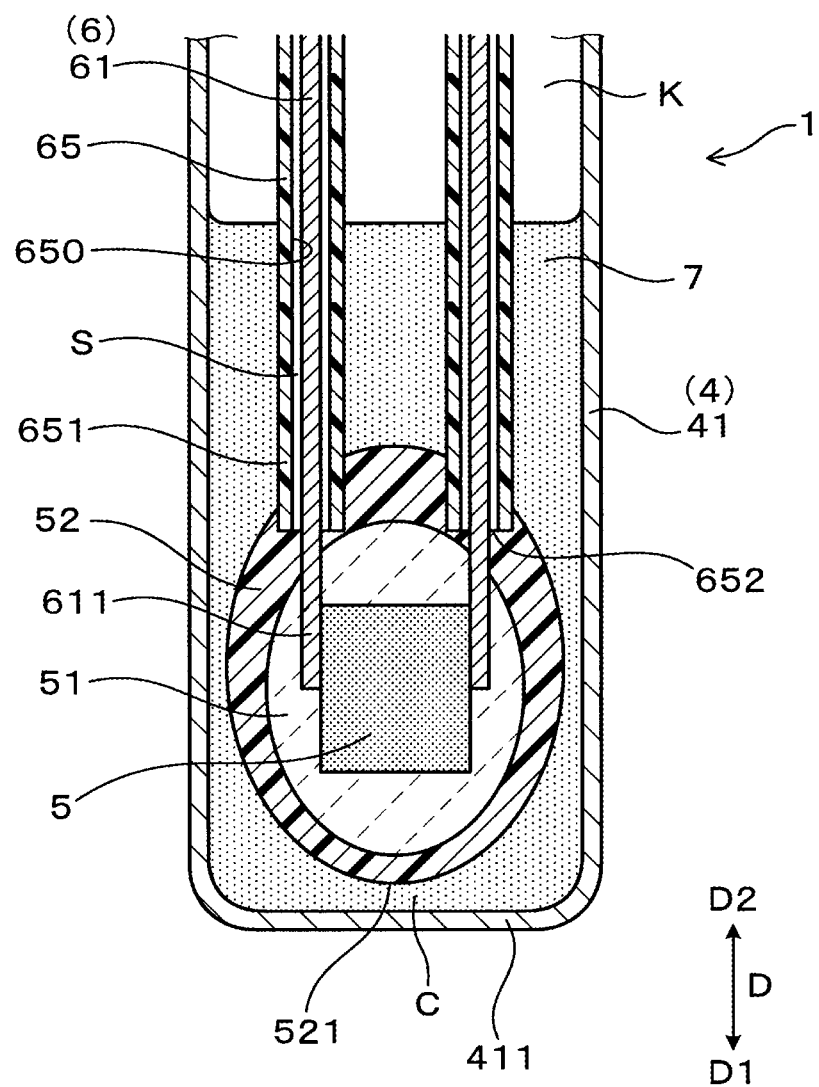
FIG. 2 is a cross-sectional view illustrating a vicinity of a temperature sensing element of the temperature sensor according to the first embodiment.

As shown in FIG. 2, the guide tube 65 has insulation properties and formed to have larger inner diameter than an outer diameter of each lead wire 6. The guide tube 65 forms a gap S between the lead wire 6 and the guide tube 65 to cover the lead wire 6. The filler 7 directly or indirectly touches the temperature sensing element 5 and the tip end 651 of the guide tube 65, and the tip end region inside the cover 4 being filled with the filler 7. The space K is formed in the base end side D2 in a region filled with the filler 7 within the cover 4.

In the temperature sensor 1, a tip end side D1 is defined as a side where the temperature sensing element 5 is disposed to detect the temperature and a base end side D2 which is opposite side with respect to the tip end side D1. Also, a direction referred to define the tip end side D1 and the base end side D2 is defined as an axial direction D. The axial direction D is the same as a direction along which the center axis line of the housing 2 and the cover 4 pass.

Hereinafter, the temperature sensor 1 of the first embodiment will be described in detail.

[Temperature Sensor 1]

Figure 3:
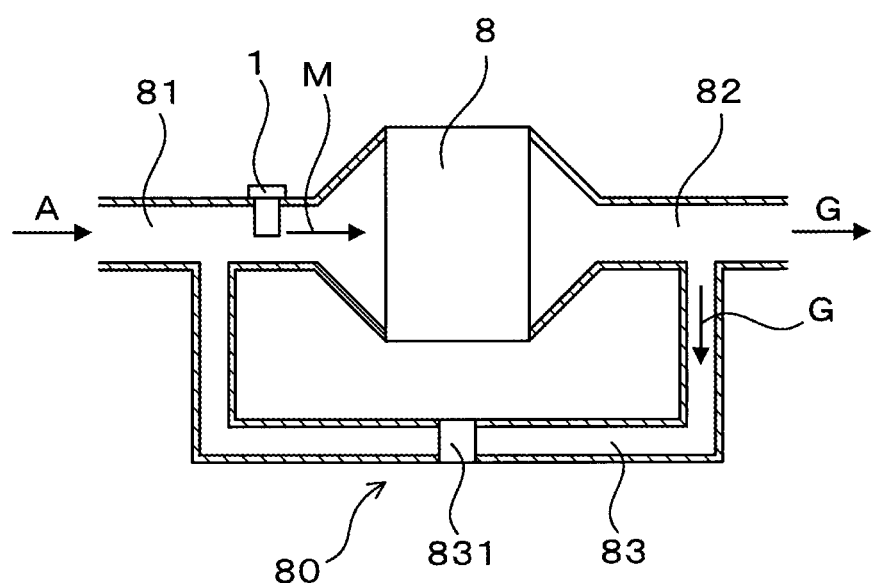
FIG. 3 is a diagram illustrating the temperature sensor disposed in an intake pipe of an internal combustion engine provided with an exhaust gas re-cycling mechanism according to the first embodiment.

The temperature sensor 1 of the first embodiment is mounted on a vehicle, and used for measuring the temperature of fluid flowing through an intake pipe 81 or an exhaust pipe 82 of an internal combustion engine 8 in the vehicle. As shown in FIG. 3, the temperature sensor 1 is disposed in the intake pipe 81 of the internal combustion engine 8 having an exhaust gas re-cycling mechanism 80 in which a part of exhaust gas G is recycled to combustion air A. The exhaust gas re-cycling mechanism 80 recycles a part of exhaust gas G exhausted to the exhaust pipe 82 from the internal combustion engine 80, to the intake pipe 81 of the internal combustion engine 8. The exhaust gas re-cycling mechanism 80 is provided with a recycling pipe 83 branched from the exhaust gas pipe 82 to connect to the intake pipe 81, and a flow rate adjustment valve 831 that adjusts the flow rate of the exhaust gas G flowing through the recycling pipe 83. The temperature sensor 1 according to the present embodiment is disposed in a downstream side in a flow of the mixed gas M of the combustion air A and the exhaust gas G compared to a position of a junction between the intake pipe 81 and the recycling pipe 83.

[Temperature Sensing Element 5]

The temperature sensing element 5 according to the first embodiment is a thermistor constituted by sintered ceramics as a material. The thermistor may be configured of a NTC (negative temperature coefficient) thermistor, where electrical resistance gradually decreases in response to an increase in temperature. Other than the NTC thermistor, the thermistor may be configured of a PTC (positive temperature coefficient) thermistor, where electrical resistance rapidly increases in response to an increase in the temperature when exceeding a predetermined temperature, or a CTC (critical temperature coefficient), where electrical resistance rapidly decreases when exceeding a predetermined temperature.

Also, the temperature sensing element 5 may be made of material such as platinum, copper and nickel and may be configured as a temperature measurement resistance element in which electrical resistance increases in response to an increase in temperature.

When the temperature sensing element 5 is configured as a thermistor, the pair of lead wires 6 can be bonded to both sides of the temperature sensing element 5. When the temperature sensing element 5 is configured of a temperature measurement resistance element, the pair of lead wires 6 can be configured of platinum line or metal line similar to that of the temperature measurement resistance element.

As shown in FIG. 2, the temperature sensing element 5 and a tip end 611 of the pair of lead wires 6 are covered by a sealing glass 51. The sealing glass 51 is used for electrically insulation and airtight sealing between different materials. Specifically, the sealing glass 51 of the first embodiment functions to provide electrical insulation and airtight sealing between the temperature sensing element 4 made of ceramic and the pair of lead wires 6 made of metal. The sealing glass 51 is made of glass such as SiPbBa, for example.

[Lead Wire 6]

The pair of lead wires 6 are designed to have a small diameter because of reduced diameter of the temperature sensor 1. The pair of lead wires 6 according to the first embodiment is configured of a round wire having diameter $\varphi$ 0.1 to 0.6 mm. In the case where the diameter of the lead wire 6 is smaller than $\varphi$ 0.1 mm, the lead wire 6 is difficult to produce and strength of the lead wire 6 is insufficient. In the case where the diameter of the lead wire 6 is larger than $\varphi$ 0.6 mm, the diameter of the temperature sensor 1 cannot be reduced.

The lead wire 6 may be designed to have the diameter to be $\varphi$ 0.6 mm or less or $\varphi$ 0.4 mm or less, whereby the guide tube 65 enhances an effect of guiding the lead wire 6 that vibrates because of resonance. That is, when the diameter of the lead wire 6 is designed to be $\varphi$ 0.6 mm or less, the mass and rigidity of the lead wire 6 are small. Therefore, similar to the lead wire 6, even when the guide tube 65 having smaller mass and rigidity is used, the lead wire 6 is able to support shaking due to the resonance of the lead wire 6.

Figure 4:
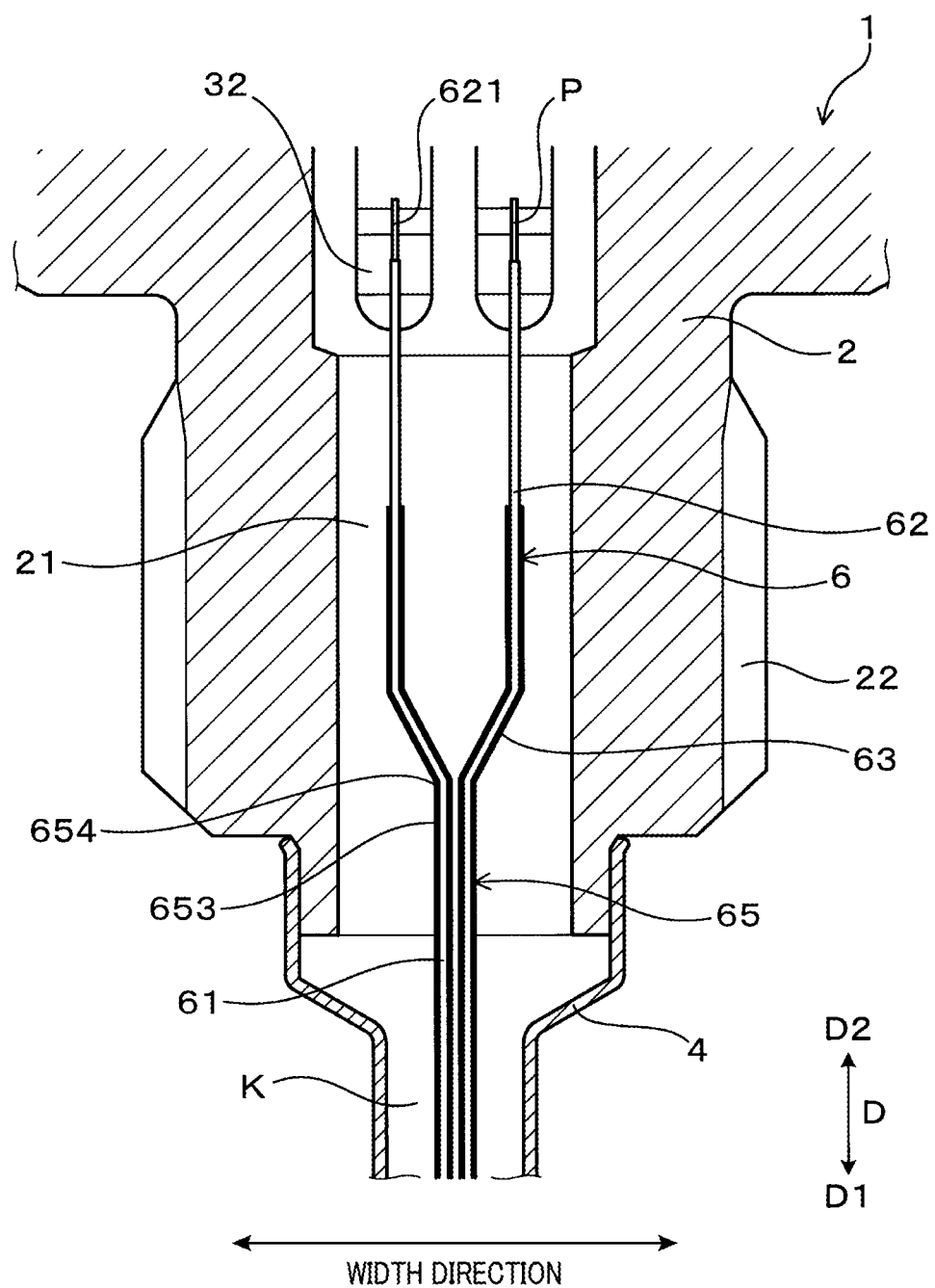
FIG. 4 is a cross-sectional view illustrating a vicinity of a terminal in the temperature sensor according to the first embodiment.

As shown FIGS. 1 and 4, a gap between the base ends 62 of the pair of lead wires 6 disposed in the housing 2 is larger than a gap between the tip ends 61 of the pair of lead wires 6 disposed at least in the cover 4. The tip ends 61 of the pair of lead wires 6 are connected to the temperature sensing element 5. A gap between the tip ends 61 of the pair of lead wires 6 is the same as a gap of a portion at which the lead wires are connected to the temperature sensing element 5. Also, each base end of the pair of lead wires 6 is connected to the terminal 32 of the connector 3. A gap between the pair of terminals 32 of the connector 3 in the width direction is set to be larger than a gap between the tip ends 61 of the pair of lead wires 6 in the width direction.

The tip end 61 and the base end 62 in the pair of lead wires 6 are arranged to be substantially parallel to the axial direction D of the housing 2 and the cover 4. A slope portion 63 is formed between the tip end 61 and the base end 62 of the pair of lead wires 6 such that the pair of lead wires 6 are inclined towards the tip end 61 from the base end 62 to approach each other. The slope portion 63 of the pair of lead wires 6 is disposed in the housing 2.

The pair of lead wires 6 are configured of various metal materials having electrical conductivity. The pair of lead wires 6 may be made of an alloy such as FeNi. The lead wires 6 may be bonded to an element side lead disposed in the temperature sensing element 5 as being butted to each other overlapped from each other by welding or the like.

[Guide Tube 65]

As shown in FIGS. 2 and 4, the guide tube 65 according to the first embodiment is provided to guide each lead wire 6 individually. The guide tube 65 is configured linearly to have cylindrical shape in its cross section. The guide tube 65 is configured of thermosetting resin having insulation properties. The guide tube 65 may be made of polyimide as a thermosetting resin having heat resistant properties. The guide tube 65 has appropriate rigidity even it is made of resin so that linear shape can be maintained.

The guide tube 65 according to the first embodiment covers a part of the tip ends 61, the slope portion 63 and the base portion 62 of the pair of lead wires 6. The guide tube 65 is not provided in the connection portion P between the pair of lead wires 6 and the terminals 32. The length of the guide tube 65 attached to the lead wires 6 can be appropriately changed. The tip end 651 of the guide tube 65 is fixed to the temperature sensing element 5, the filler 7 or the like. On the other hand, the base end 653 of the guide tube 65 is not fixed to a member around the lead wire 6 or the like. Base end openings 654 of the guide tube 65 is located in a space K in the cover 4 to be opened in the space K.

As shown in FIG. 2, the guide tube 65 includes an insertion hole 650 through which the lead wire 6 insert. The outer diameter of the guide tube 65 is set such that both guide tubes 65 do not touch each other when the guide tube 65 is attached to the lead wire 6. The inner diameter of the guide tube 65 can be 1.2 to 2.0 times as much as the outer diameter of the lead wires 6, for example. By appropriately setting a ratio of the outer diameter of the lead wire 6 to the inner diameter of the guide tube 65, the guide tube can be prevented from resonating with the lead wires 6 and resonance of the lead wires 6 can be reduced.

The material and the thickness of the guide tube 65 is determined such that the natural frequency of the guide tube 65 differs from that of the lead wires 6. Also, the material and the thickness can be determined preventing resonance in the guide tube 65 triggered by resonance of the lead wires 6.

For the gap S formed between the guide tube 65 and the lead wires 6, a difference value in which the outer diameter dimension of the lead wire 6 is subtracted from the inner diameter dimension of the guide tube 65 is constant in the axial direction D of the guide tube 65. It should be noted that the base end 653 of the guide tube 65 is in a free state except that the position thereof is restrained by the lead wires. Therefore, the gap S formed between the guide tube 65 and the lead wire 6 is likely to vary at positions along the axial direction D and the circumferential direction of the lead wire 6 and the guide tube 65.

The natural frequency refers to a frequency at which an object vibrates as a resonance, and the frequency is inherent to the object. The natural frequency is determined depending on amount of mass and a rigidity of a beam serving as a spring. When the mass of the object is small or the rigidity of the beam is large, the natural frequency is high. On the other hand, when the mass of the object is small, or the rigidity of the beam is low, the natural frequency is low.

The guide tube 65 can be configured as common tube that allows a pair of lead wires 6 to be inserted into the guide tube 65, being mutually insulated, other than a case where the guide tube 65 is provided for each lead wire 6. That is, the guide tube 65 can be configured to have a shape having two insertion holes 650 through which the pair of lead wires 6 are inserted.

[Protective Film 52]

As shown in FIG. 2, the temperature sensing element 5 is provided with a protective film 52 on the surface thereof in order to reduce thermal stress produced on the pair of lead wires 6. The protective film 52 covers the sealing glass 51, the lead wire 6 extending from a tip end opening 652 of the guide tube 65, a gap S between the tip end opening 652 of the guide tube 65 and the lead wire 6. Specifically, the protective film 52 of the present embodiment covers the whole sealing glass 51, the whole portion of lead wire 6 extended from the tip end opening of the guide tube 65 and the gap S between the tip end opening 652 of the guide tube 65 and the lead wire 6. In other words, the gap S between the tip end opening 652 of the guide tube 65 and the lead wire 6 is sealed by the protective film 52. Since the protective film 52 is present, the filler 7 cannot touch the sealing glass 51 and the lead wires 6.

Also, by the presence of the protective film 52, the filler 7 cannot enter the gap S between the guide tube 65 and the lead wire 6 from the tip end opening 652 of the guide tube 65. Thus, the gap S between the guide tube 65 and the lead wire 6 can be prevented from being filled with the filler 7.

The protective film 52 is constituted of a thermosetting resin. The protective film 52 can be made of polyimide as a thermosetting resin having heat resistant properties. The filler 7 is composed of ceramic powder, and fills in a tip end portion of the cover 4 in a state where the ceramic powder is sintered to be coupled to each other.

The linear expansion coefficient of the protection layer 52 is smaller than that of the lead wire 6 and larger than that of the filler 7. The linear expansion coefficient of FeNi alloy composing the lead wire 6 of the present embodiment is $9.6 \times 10^{-6}$ (/° C.), and the linear expansion coefficient of the ceramic composing the filler 7 is $4.5 \times 10^{-6}$ (/° C.). The linear expansion coefficient of polyimide composing the protective film 52 of the present embodiment is $8.0 \times 10^{-6}$ (/° C.).

The filler 7 does not touch the sealing glass 51 and the lead wires 6 but touches the protective film 52 and the tip end 651 of the guide tube 65. In other words, the filler 7 only touches the tip end 651 of the guide tube 65 and the inner surface of the cover 4.

Compared to a difference between the linear expansion coefficient of the material that constitutes the lead wire 6 and the linear expansion coefficient of the material that constitutes the filler 7, a difference between the linear expansion coefficient of the material that constitutes the lead wire 6 and the linear expansion coefficient of the material that constitutes protective film 52 is small. Compared to a difference between the linear expansion coefficient of the material that constitutes the lead wire 6 and the linear expansion coefficient of the material that constitutes the filler 7, a difference between the linear expansion coefficient of the material that constitutes the filler 7 and the linear expansion coefficient of the material that constitutes protective film 52 is small.

Presence of the protective film 52 minimizes a difference between different types of materials which touch each other. Hence, thermal stress produced between the lead wire 6 and the filler 7 due to difference between the linear expansion coefficients can be reduced. Thus, durability of the temperature sensor 1 can be enhanced.

[Housing 2]

As shown in FIGS. 1 and 4, the housing 2 includes an arrangement hole 21 for arranging the pair of lead wires 6 and the terminal 32 of the connector 3, an outer screw 22 for attaching the temperature sensor 1 to a pipe, and a connecting portion 23 for connecting the connector 3. A part of the terminal 32 of the connector 3 is inserted into the arrangement hole 21, and a connector body 31 of the connector 3 is connected to the connecting portion 23. The tip ends 611 of the pair of lead wires 6 are fixed to the cover 4 via the filler 7, and the base end 621 is fixed to the housing 2 via the terminal 32 of the connector 3.

[Connector 3]

As shown in FIG. 1, the connector 3 includes the connector body 31 made of resin or the like having insulation properties and the terminal 32 provided in the connector 31. The tip end 321 of the terminal 32 is protruded from the connector body 31 such that the base end 621 of the lead wire 6 is connected. The base end 322 of the terminal 32 is disposed in the connector body 31. The base end 322 of the terminal 32 is connected to a control unit 10 that controls an operation of the temperature sensor 1. The terminal 32 is made of metal material having electrical conductivity. The base ends of the pair of lead wires 6 are resistance-welded, thereby being bonded to the tip end of the terminal 32.

[Cover 4]

As shown in FIG. 1, the cover 4 is formed in a bottomed cylindrical shape. In the cover 4, the temperature sensing element 5 is disposed. Also, the cover 4 includes a detection cover 41 having the smallest outer diameter compared to other part of the cover 4, an attachment cover 42 attached to an outer periphery of the tip end of the housing 2, having the largest outer diameter compared to the other part thereof, and an intermediate cover 43 provided between the detection cover 41 and the attachment cover 42. Specifically, the detection cover 41 part functions as a center part of the temperature measurement at which the temperature sensing element 5 is disposed, so that responsiveness of the temperature measurement can be enhanced when reducing the diameter.

[Filler 7]

As shown FIG. 2, ceramic powder is used for the filler 7. The ceramic powder may contain glass powder. The filler 7 is disposed in the tip end part in the detection cover 41 of the cover 4. An amount usage of the filler 7 can be reduced as much as possible within an area where the space K of the tip end position of the detection cover 41 is filled with the filler 7, covering the tip end 651 of the guide tube 65. When the amount of usage of the filler 7 is reduced, the heat capacity can be reduced, whereby a temperature measurement response can be enhanced by the temperature sensor 1.

After heating the assembled temperature sensor 1 and sintering the ceramic powder that composes the filler 7, the temperature sensing element 5, the sealing glass 51, the protective film 52 and the tip end of the guide tube 65 are fixed to the detection cover 41 by the filler 7.

As shown in FIG. 2, a clearance C is formed between an inner surface of the tip bottom end 411 of the detection cover 41 of the cover 4 and the tip end 521 of the protective film 52. The clearance C is filled with the filler 7. The length of the pair of lead wires 6 is determined, considering the length of the cover 4 and the position at which the cover 4 is attached to the housing 2, such that the tip end 521 of the protective film 52 does not touch the inner surface of the tip bottom end 411 of the cover 4.

The clearance C is formed between the tip bottom end 411 of the cover 4 and the tip end 521 of the protective film 52, whereby the pair of lead wires 6 can be prevented from being applied with a stress from the cover 4. When the protective film 52 touches the tip bottom end 411 of the cover 4, a load is applied to the pair of lead wires 6 for bending these lead wires 6. In this case, unnecessary stress is applied to a connection portion P between the pair of lead wires 6 and the terminal 32. Contact between the inner surface of the tip bottom end 411 of the cover 4 and the tip end 521 of the protective film 52 may occur when assembling the temperature sensor 1.

Further, the filler 7 is provided in the clearance C between the inner surface of the tip bottom end of the cover 4 and the tip end 521 of the protective film 52. Hence, the pair of lead wires 6 can be prevented from being applied with a load from the cover 4, when the temperature sensor 1 is heated and cooled so that cover 4 is thermal contracted. Then, the stress applied to the connection portion P between the pair of lead wires 6 and the terminal 32 can be reduced.

[Space K]

As shown, in FIG. 1, the space K in the cover 4 is formed in a part of the base end D2 in the detection cover 41, in the intermediate cover 43, and at a part of tip end D1 in the attachment cover 42. This space K is provided to reduce heat capacity of the temperature sensor 1. When the temperature sensor 1 vibrates, the pair of lead wires 6 and the guide 65 vibrate in the space K.

[Manufacturing Method]

Figure 5:
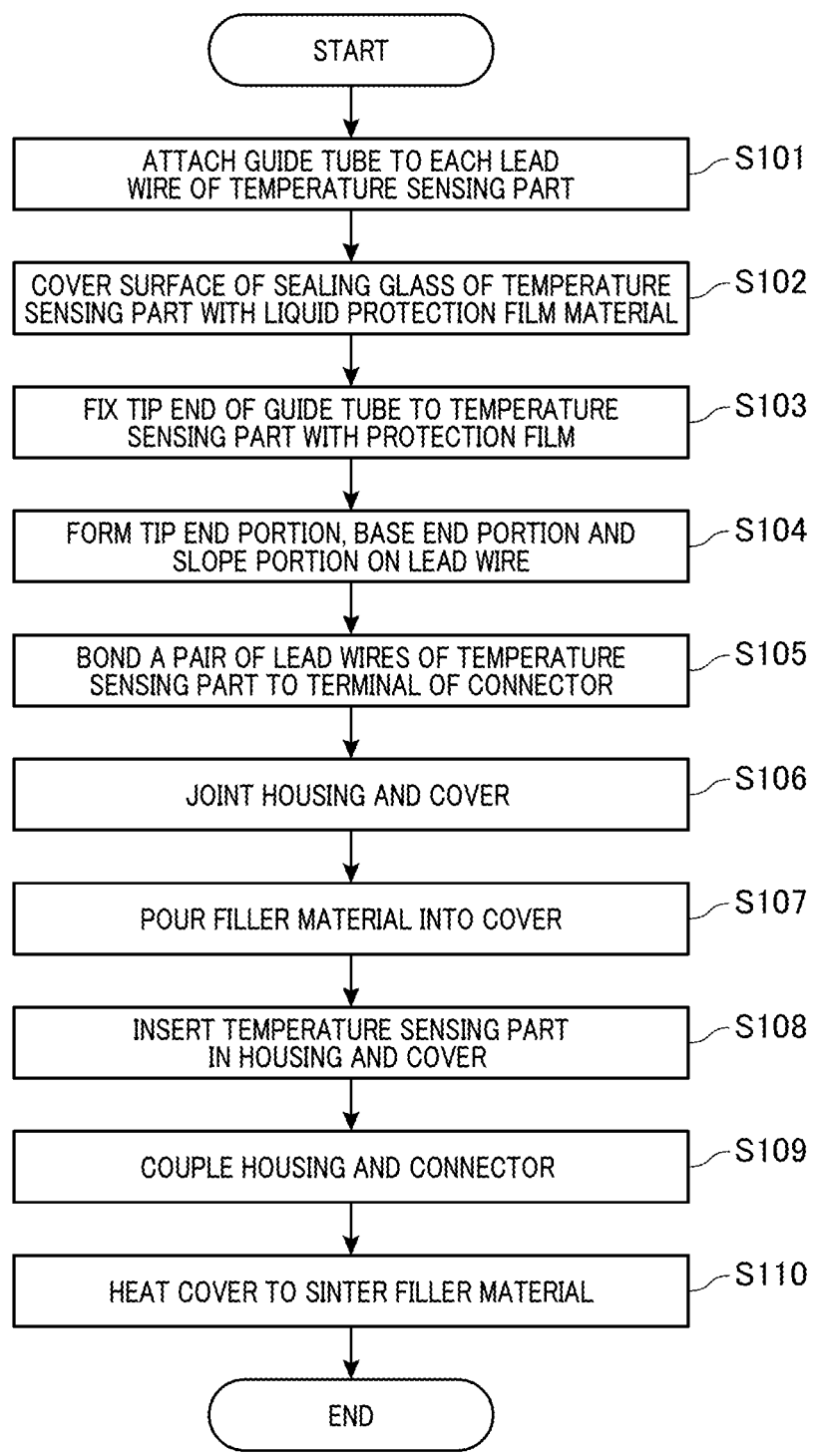
FIG. 5 is a flowchart showing a manufacturing method of a temperature sensor according to the first embodiment.

Next, with reference to a flowchart shown in FIG. 5, a manufacturing method of the temperature sensor 1 of the present embodiment will be described.

Figure 6:
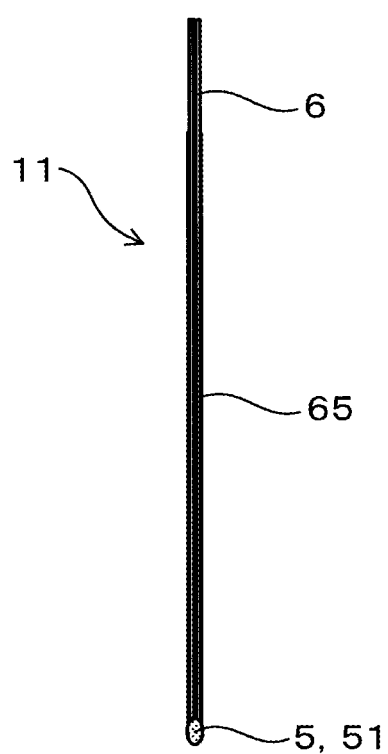
FIG. 6 is a diagram illustrating a state where a guide tube is attached to a lead wire of a temperature sensing element body according to the first embodiment.
Figure 7:
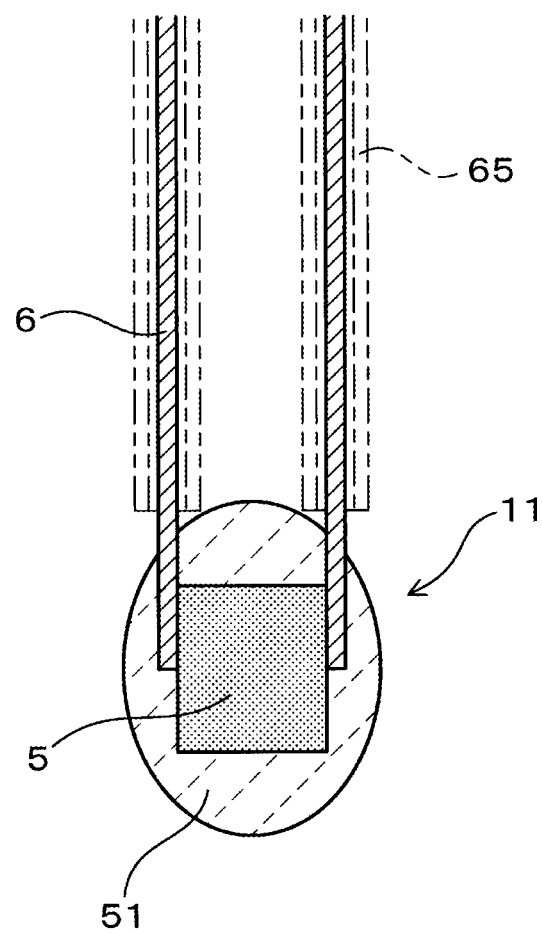
FIG. 7 is an enlarged diagram illustrating a state where the guide tube is attached to the lead wire of the temperature sensing element body according to the first embodiment.

When manufacturing the temperature sensor 1, as shown in FIGS. 6 and 7, first, a temperature sensing element body 11 is prepared, which is covered by the sealing glass 51 at a portion of the temperature sensing element 5 and at the tip end 611 of the pair of lead wires 6. Then, the guide tube 65 is attached to each of the lead wires 6 in the temperature sensing element body 11 (step S101 shown in FIG. 5).

Figure 8:
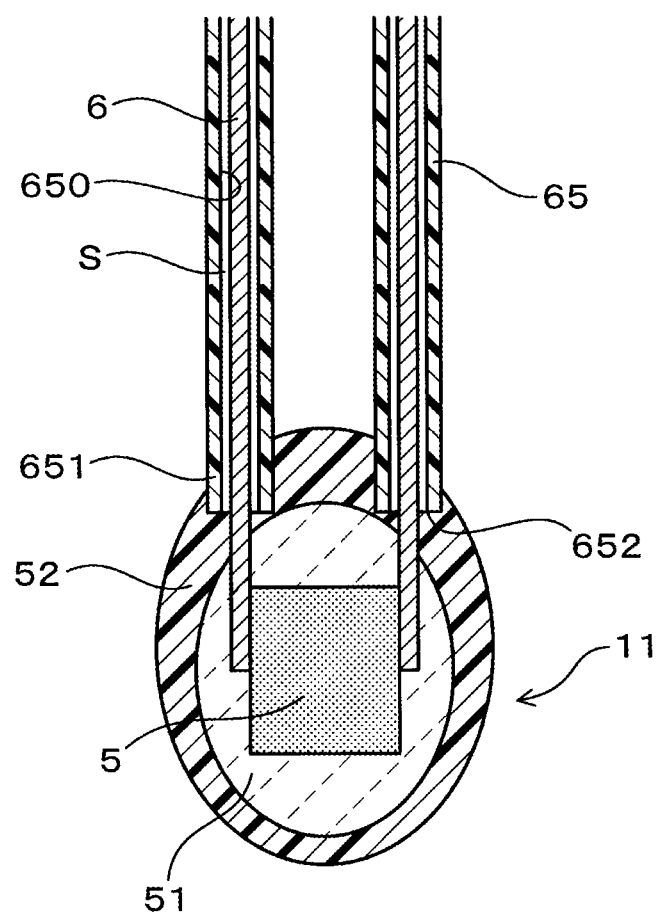
FIG. 8 is an enlarged diagram illustrating a state where a tip end portion of the temperature sensing element body and the guide tube are covered by a protection film according to the first embodiment.

Next, as shown in FIG. 8, the surface of the sealing glass 51 in the temperature sensing element body 11 is covered by a protective film material in a liquid form in order to form the protective film 52 (step S102). At this moment, the liquid material of the protective film covers the sealing glass 51, a part of lead wire 6 protruding from the tip end opening 652 of the guide tube 65, and the gap S between the tip end opening 652 of the guide tube 65 and the lead wire 6.

Next, the liquid material of the protective film is cured so that the protective film 52 is formed. Thereafter, the tip end 651 of the guide tube 65 is fixed to the temperature sensing element body 11 buy the protective film 52, under a state where the tip end opening 652 of the guide tube 65 is closed (step S103). Next, the pair of lead wires 6 of the temperature sensing body 11 is bent so that portions where the guide tube 65 is attached to the pair of lead wires 6 are formed (step S104). These portions are referred to as the tip ends 61, the base ends 62 and the slope portion 63.

Figure 9:
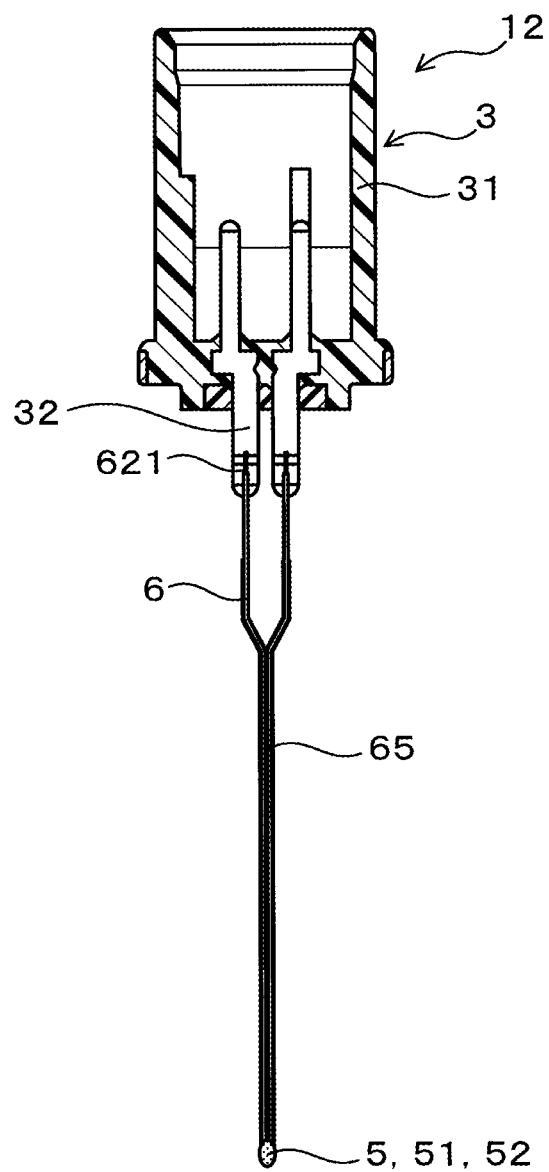
FIG. 9 is a diagram showing a first assembly in which lead wires of the temperature sensing element body are connected to the terminal in the connector according to the first embodiment.

Then, as shown in FIG. 9, the base ends 621 of the pair of lead wires 6 in the temperature sensing body 11 are bonded to the terminal 32 of the connector 3 by resistance-welding (step S105). Thus, a first assembly 12 is configured to integrate the temperature sensing body 11 including the guide tube 65 and the protective film 52, and the connector 3.

Figure 10:
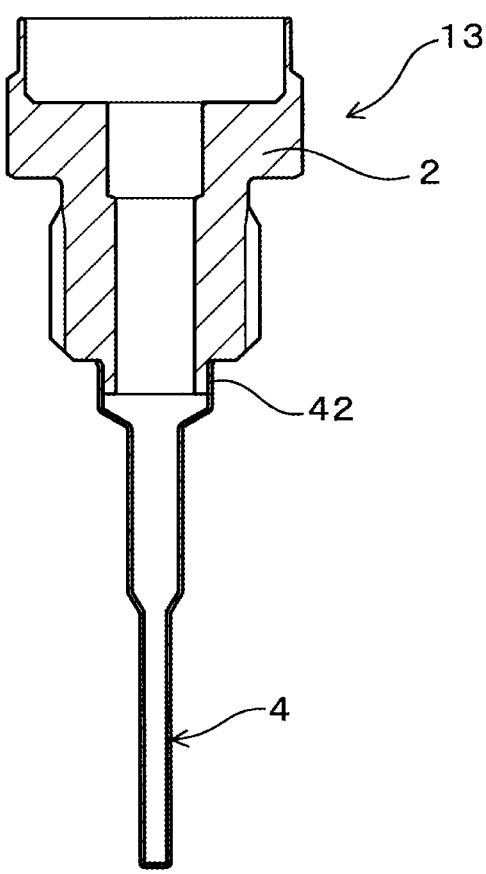
FIG. 10 is a diagram showing a second assembly in which a housing and a cover are bonded according to the first embodiment.
Figure 11:
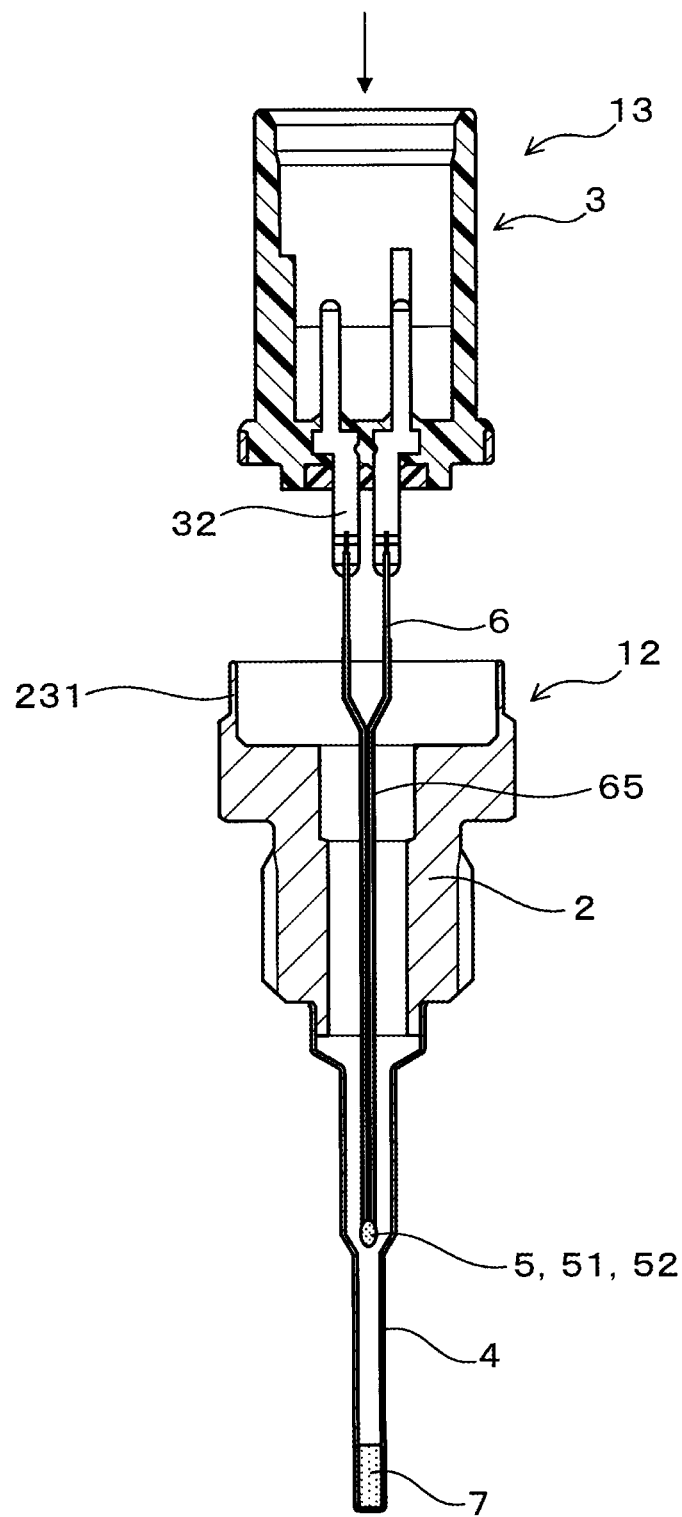
FIG. 11 is a diagram illustrating an assembling state where the first assembly and the second assembly are being assembled according to the first embodiment.

On the hand, as shown in FIG. 10, the attachment cover 42 of the cover 4 is attached to the outer periphery of the tip end in the housing 2, and both parts are bonded by welding or the like (step S106). Thus, the second assembly 13 integrating the housing 2 and the cover 4 is constituted. Thereafter, as shown in FIG. 11, a material of the filler is poured into the detection cover 41 of the cover 4 in the second assembly 13, in order to form the filler 7 (step S107). The filler material contains ceramic powder with water as a solvent and is poured into the tip end (bottom portion) in the detection cover 41.

Next, as shown in FIG. 10, a temperature sensing element body 12 of the first assembly 12 is inserted into the housing 2 of the second assembly 13 and the cover 4 (step S108). At this moment, the temperature sensing element 5 covered by the protective film 52, a part of the pair of lead wires 6 protruded from the tip end opening 652 of the guide tube 65, and the tip end 651 of the guide tube 65 in the first assembly 12 are immersed in the filler material (See FIG. 2). Then, the clearance C is formed between the tip end 521 of the protective film 52 and the inner surface of the tip bottom end 411 of the detection cover 41. The filler material is filled in the clearance C.

Next, the connector 3 of the first assembly 12 is connected to the connecting portion 23 of the housing 2 in the second assembly such that a protrusion 231 provided in the connecting portion 23 is deformed and caulked with the connector 3 (step S109). Thus, the first assembly 12 and the second assembly 13 are integrated. Then, a vicinity of the detection cover 41 of the cover 4 in the second assembly 13 is heated (step S110). Thus, the solvent that constitutes the filler material is volatized and the ceramic powder that constitutes the filler material is sintered, thereby producing the filler 7. As a result, the temperature sensor 1 is produced.

[Effects and Advantages]

The temperature sensor 1 according to the present embodiment is installed on a vehicle where vibrations frequently occur, in which resonance of the pair of lead wires 6 is reduced. Specifically, a pair of lead wires 6 are covered by the guide tube 65, and the gap S that allows the lead wire 6 to vibrate in the guide tube 65 is formed between each lead wire 6 and the guide tube 65. Further, the temperature sensing element 5 and the tip end 651 of the guide tube 65 are fixed to the tip end position in the detection cover 41 of the cover 4 by the filler 7. The space K is provided in the base end side D2 in a region where the filler 7 is filled within the cover 4

According to these configurations, when the temperature sensor 1 suffers vibration, the pair of lead wires 6 and the guide tube 65 may vibrate in the space K. Even when the vibration frequency of the temperature sensor 1 overlaps with the natural frequency of the pair of lead wires 6 and thus causing vibration of the pair of lead wires 6, the vibration of the pair of lead wires can be prevented from being vibrated because of the following reasons.

The pair of lead wires 6 are configured as conductors having electrical conductivity. The guide tube 65 is configured as a tube having insulation properties. The mass and rigidity of both of the lead wires and the guide tube are different from each other and also the natural frequencies thereof are different form each other as well. When vibration is applied to the pair of lead wires 6 and the guide tube 65, if the vibration frequency overlaps with the natural frequency of the pair of lead wires 6, the pair of lead wires 6 tends to sway significantly due to the resonance phenomenon. At this time, because of the gap S being formed between the pair of lead wires 6 and the guide tube 65, the guide tube 65 does not vibrate together with the pair of lead wires. Also, when the pair of lead wires 6 resonate, the guide tube 65 does not vibrate.

Thus, vibration of the pair of lead wires 6 can be reduced by the guide tube 65. In other words, the sway caused by resonance of the pair of lead wires 6 is limited to a sway within the guide tube 65. Therefore, due to presence of the guide tube 65, resonance of the pair of lead wires 6 can be reduced, and stress applied, when the pair of lead wires 6 sways, to the connection portion P between the pair of lead wires 6 and the terminal 32 of the connector 3 can be reduced. As a result, durability of the temperature sensor 1 against vibration can be improved.

Figure 12:
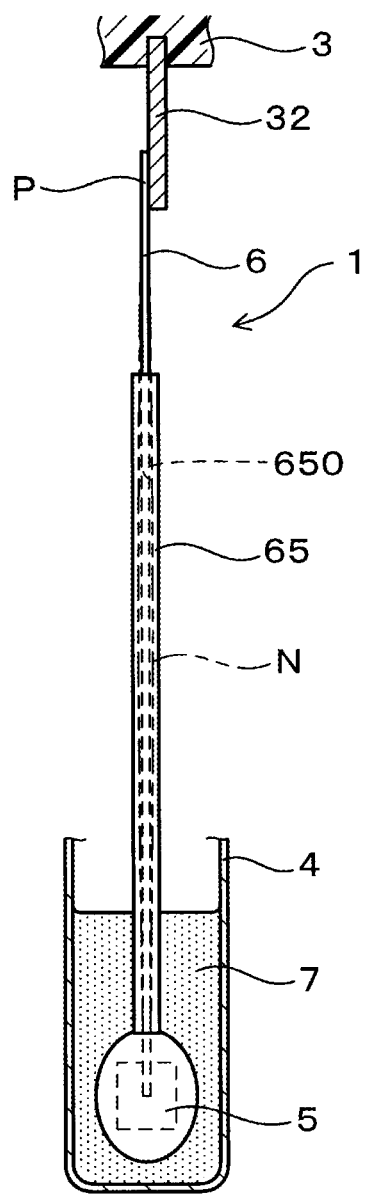
FIG. 12 is a diagram schematically showing a state where a lead wire resonates when a guide tube is attached to the lead wire and the temperature sensing element is fixed by a filler according to the first embodiment.
Figure 13:
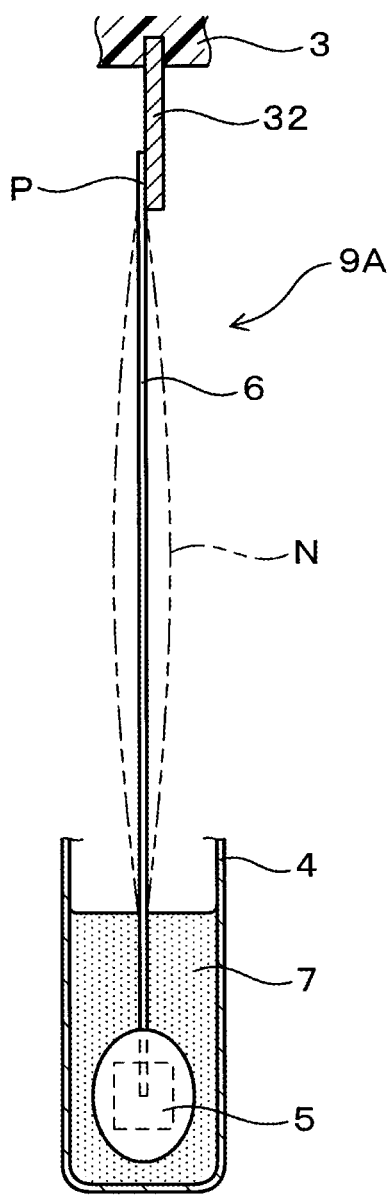
FIG. 13 is a diagram schematically showing a state where a lead wire resonates when a guide tube is not attached to the lead wire and the temperature sensing element is fixed by a filler according to a first comparative embodiment.
Figure 14:
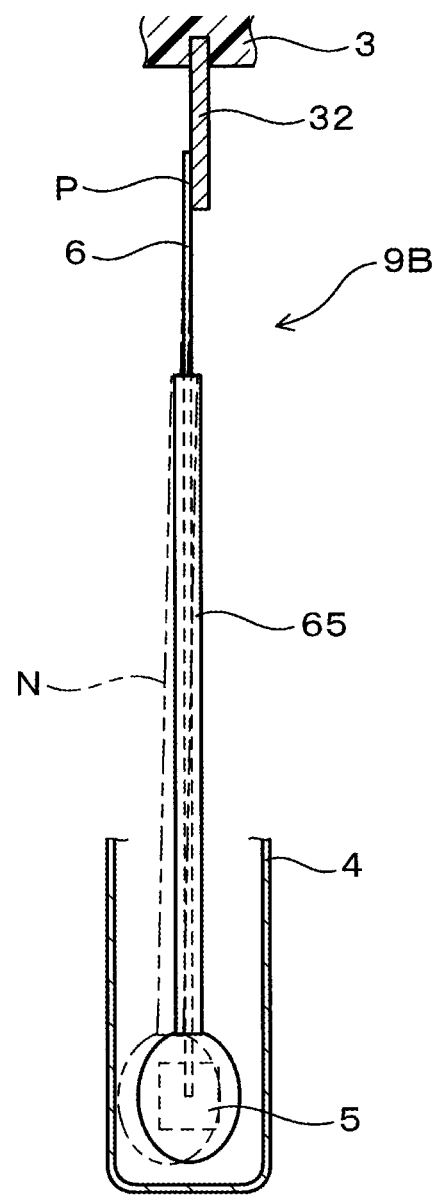
FIG. 14 is a diagram schematically showing a state where the lead wire resonates when a guide tube is attached to the lead wire and the temperature element is not fixed by a filler according to a second comparative embodiment.

FIG. 12 schematically illustrates a state where the lead wire 6 resonates in the temperature sensor 1 according to the present embodiment in which the guide tube 65 is attached to the lead wire 6, and the temperature sensing element 5 is fixed by the filler 7. FIG. 13 schematically illustrates a state where the lead wire 6 resonates in the temperature sensor 9A as a first comparative embodiment in which the guide tube 65 is not attached to the lead wire 6 and the temperature sensing element 5 is fixed by the filler 7. Also, FIG. 14 schematically illustrates a state where the lead wire resonates in the temperature sensor 9B as a second comparative embodiment in which the guide tube 65 is attached to the lead wire 6 and the temperature sensing element 5 is not fixed by the filler 7. In each drawing, sway of the lead wire 6 is indicated by a two dot chain line N.

As shown in FIG. 13, when the guide tube 65 is not present, the lead line 6 resonates in the space K without any restriction so that stress produced in the connection portion P between the lead wire 6 and the terminal 32 becomes larger. As shown in FIG. 14, even when the guide tube 65 is attached to the lead wire 6, if there is no filler 7 in the cover 4 and the temperature sensing element 5 is floating, the lead wire 6 together with the guide tube 65 vibrates significantly.

On the other hand, as shown in FIG. 12, in the case where the guide tube 65 and the filler 7 are present, when the lead wire 6 resonates, the lead wire 6 touches the inner periphery surface of the insertion hole 650. Thus, amplitude of the sway caused by the resonance of the lead wire 6 can be reduced to be smaller so that stress applied to the connection portion P between the lead wire 6 and the terminal 32 becomes small.

Figure 15:
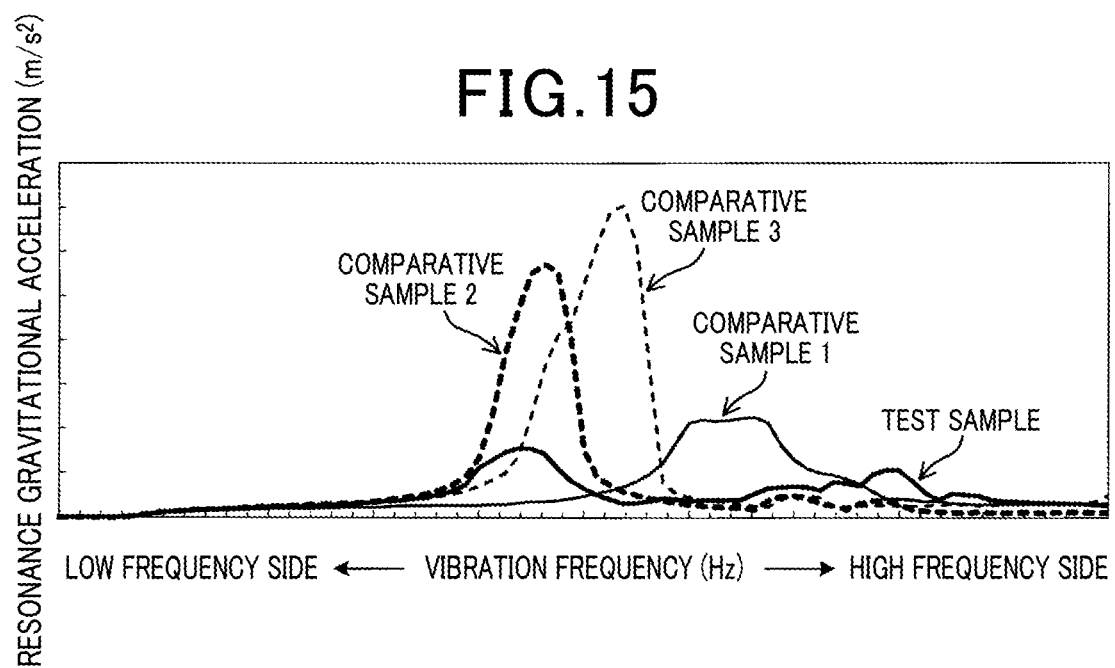
FIG. 15 is a graph showing a relationship between a frequency (Hz) of a vibration applied to the temperature sensor and a resonance gravitational acceleration (m/s$^2$) applied to the lead wire.

FIG. 15 shows a relationship between a frequency (Hz) of the vibration applied to the temperature sensor 1 and a resonance gravitational acceleration (m/s$^2$) applied to the lead wire. The resonance gravitational acceleration indicates gravitational acceleration at a portion where the maximum amplitude of vibration occurs. The test sample (sample for evaluating the configuration according to the present disclosure) is tested under a condition where the guide tube 65 is attached to the pair of lead wires 6 and the temperature sensing element 5 is fixed by the filler 7 filled in the cover 4. The comparative sample 1 is tested under a condition where the guide tube 65 is present but the filler 7 is not present. The comparative sample 2 is tested under a condition where the guide tube 65 is not present, but the filler 7 is present. The comparative sample 3 is tested under a condition where the guide tube 54 and the filler 7 are not present. The configurations of the guide tube 65 and the filler 7 are the same as those of the present embodiment.

As shown in FIG. 15, in the case of the comparative sample 4 in which the guide tube 65 and the filler 7 are not present, the peak value of the resonance gravitational acceleration was maximum in the test sample and comparative samples 1 to 3. Moreover, in the case of the comparative sample 2, the frequency corresponding to the peak value of the resonance gravitational acceleration was slightly smaller than that of the comparative sample 3 and the frequency of the peak value of the resonance gravitational acceleration is slightly shifted to low frequency side.

For the comparative sample 1 in which the guide tube 65 is present and the filler 7 is not present, compared to the comparative samples 2 and 3, the peak value of the resonance gravitational acceleration is small and the frequency corresponding the peak value of the resonance gravitational acceleration is shifted to the high frequency side. Also, it was found that because of presence of the guide tube 65, the frequency at which resonance occurs is shifted to the higher frequency side and the amplitude of the resonance becomes smaller. In the case of the comparative sample 1, since the lead wire 6 and the guide tube 65 resonate together, it is considered that the peak value of the resonance gravitational acceleration appears at an intermediate frequency point between the natural frequency of the lead wire 6 and the natural frequency of the guide tube 65.

On the other hand, for the test sample including the guide tube 65 and the filler 7, when the peak value of resonance gravitational acceleration becomes smaller, two frequency peaks are present, in the low frequency region and high frequency region, corresponding to the peak values of the resonance gravitational acceleration. For the test sample, the peak value of the resonance gravitational acceleration in the low frequency region based on a natural frequency of the lead wire 6, and the peak value of the resonance gravitational acceleration appears in the high frequency region based on a natural frequency of the guide tube 65. The reason why such a resonance gravitational acceleration is observed is considered to be that the guide tube 65 avoids the resonance of the lead wire 6, and the lead wire 6 avoids the resonance of the lead wire 6.

Observing the waveform of the resonance gravitational acceleration of a test sample, it was confirmed that amplitude of the resonance can be minimized by attaching the guide tube 65 to the lead wire 6 and fixing the temperature sensing element 5 to the cover 4 with the filler 7.

Also, the space K is formed in the base end side D2 in a region where the filler 7 is filled within the cover 4 whereby the heat capacity of the temperature sensor 1 within the cover 4 can be minimized. The heat capacity refers to a thermal energy required to increase the object temperature to reach a predetermined temperature. When the object has smaller heat capacity, the object is heated or cooled faster, so that trackability of temperature change can be improved. Thus, the heat capacity of the temperature sensor 1 is set to be smaller within the cover 4, whereby high responsiveness of the temperature sensor 1 can be maintained when measuring the temperature.

Therefore, according to the temperature sensor 1 of the present embodiment, durability can be improved against vibration while maintaining high responsiveness.

Second Embodiment

Figure 16:
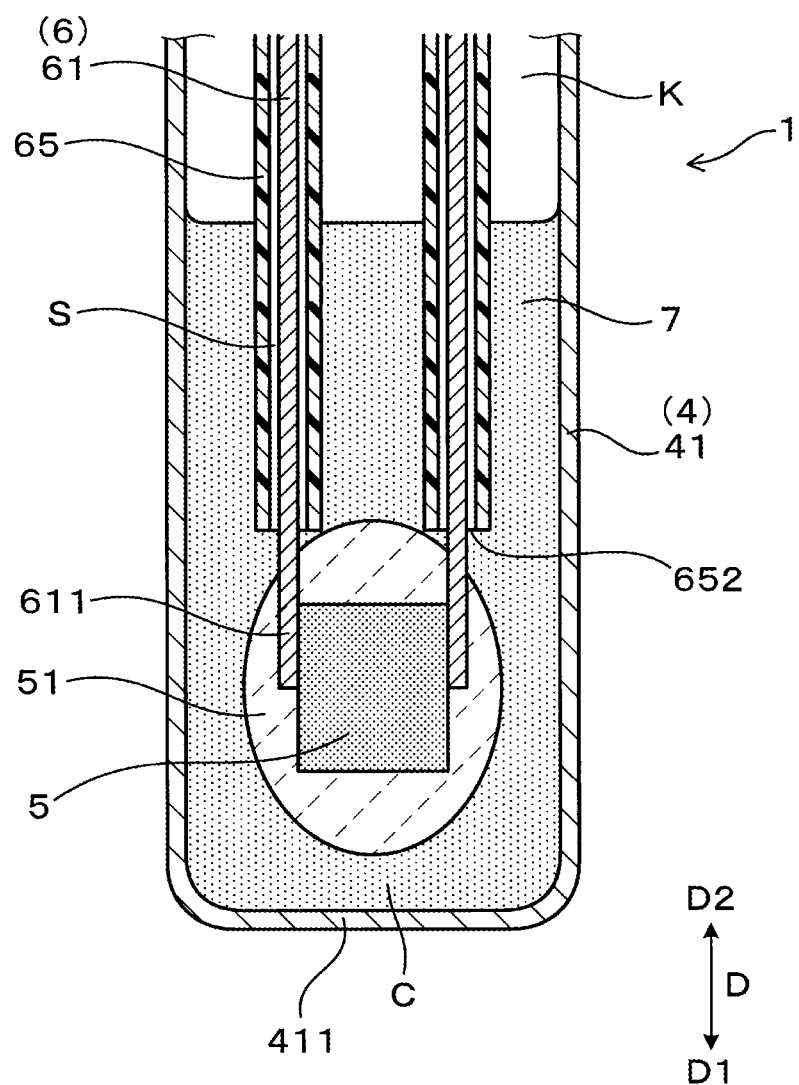
FIG. 16 is a cross-sectional view showing a vicinity of the temperature sensing element in the temperature sensor according to the second embodiment.

According to the second embodiment, as shown in FIG. 16, a case will be described in which the sealing glass 51 of the temperature sensing element 5 is not covered by the protective film 52. The protective film 52 according to the first embodiment utilizes the linear expansion coefficient ranging from a value corresponding to the lead wire 6 to a value corresponding to the filler 7, thereby reducing the thermal stress produced around the lead wire 6 and the filler 7. However, the protective film 52 may not be provided if such a thermal stress produced between the lead wire 6 and the filler 7 caused by a difference of the linear expansion coefficient therebetween can be tolerated.

According to the present embodiment, in order to prevent the filler 7 entering into the guide tube 65 from the tip end opening 652 of the guide tube 65, the tip end opening 652 of the guide tube 65 can be closed. The filler 7 may be unlikely to enter the gap S from the tip end opening 652 depending on size of the gap S formed between the lead wire 6 and the guide tube 65 and viscosity of the filler 7. In this case, means for closing the tip end opening 652 is unnecessary.

Also, according to the present embodiment, the filler 7 filled within the cover 4 covers the sealing glass 51 in the temperature sensing element 5, a part of the lead wire 6 protruded from the tip end opening 652 of the guide tube 65 and the tip end 651 of the guide tube 65. Moreover, a clearance C is formed between the sealing glass 51 and the inner surface of the tip bottom end 411 in the detection cover 411 of the cover 4, and the clearance is filled with the filler 7.

Other configurations, effects and advantages in the temperature sensor according to the present embodiment are the same as those of the first embodiment. Also in the present embodiment, elements having the same reference numbers as the first embodiment are the same as the elements shown in the first embodiment.

Third Embodiment

Figure 17:
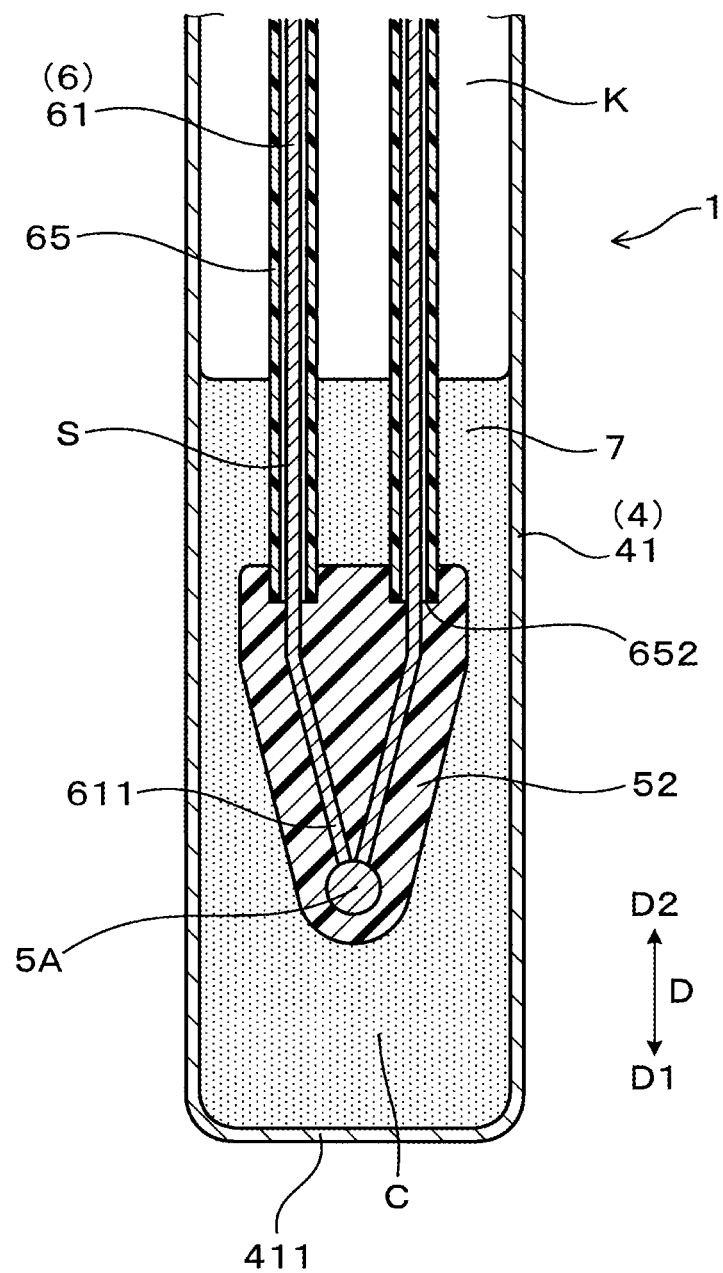
FIG. 17 is a cross-sectional view showing a portion around a temperature measuring junction in the temperature sensor according to the third embodiment.

According to the third embodiment, instead of using the temperature sensing element 5 for the temperature sensing part, as shown in FIG. 17, temperature measuring junction 5A of the thermocouple 50 is placed to detect thermal electromotive force produced by temperature difference between the pair of contacts. The thermocouple 50 utilizes thermoelectromotive force produced between a pair of contacts based on a temperature difference therebetween.

In the thermocouple 50, as a pair of contacts, the temperature measuring junction 5A to detect the temperature of the measuring object, and a cold contact as a reference used for measuring the temperature are provided. The pair of lead wires 6 are constituted by two metal lines of which the materials are different from each other. The temperature measuring junction 5A is configured as a junction in which tip ends of the two lead wires 6 are bonded from each other.

According to the third embodiment, the protective film 52 covers the temperature measuring junction 5A, a part of the lead wire 6 protruded from the tip end opening 652 of the guide tube 65, and the gap S formed between the tip end opening 652 of the guide tube 65 and the lead wire 6. Also, the filler 7 touches the protective film 52 and the tip end 651 of the guide tube 65.

In the case where the temperature sensing part is configured as the temperature measuring junction 5A of the thermocouple, similar effects and advantages to a case where the temperature sensing part is configured as the temperature sensing element 5. Other configurations, effects and advantages in the temperature sensor according to the present embodiment are the same as those of the first embodiment. Also in the present embodiment, elements having the same reference numbers as the first embodiment are the same as the elements shown in the first embodiment.

Fourth Embodiment

According to the fourth embodiment, various configurations used for the connecting portion P between the lead wire 6 and the terminal 32 will be described. Typical example of the connecting portion P is shown in FIGS. 4 and 12 of the first embodiment. When resonance phenomena appears on the pair of lead wires 6, the connecting portion P connected to the terminal 32 of the lead wire 6 is most likely to be damaged. Hence, it is desirable to optimize the connecting portion between the lead wire 6 and the terminal 32 so as to minimize the damage occurring at the connecting portion P.

[Metal Material Bonding]

The lead wire 6 and the terminal 32 are bonded with a metal material bonding in which base materials thereof are bonded to each other, or metal material bonding using metal material other than the base materials. The connecting portion P can be formed as a bonding portion. Moreover, as the metal material bonding between the lead wire 6 and the terminal 32, a fused junction bonding, a liquid-solid phase bonding or a solid-solid phase bonding can be utilized.

The fused junction bonding includes a laser welding in which a laser beam melts both base materials to be bonded therebetween, a resistance-welding in which current flows between the base materials which contact to each other, thereby bonding the base materials using electrical resistance produced on the contact surface, an arc welding in which the base materials or a filler material are melted by the arc discharge, thereby bonding the base materials, and a gas welding in which the base materials are bonded using combustion heat.

The liquid-solid phase bonding includes a brazing using brazing filler material as an adhesive, a liquid phase diffusion bonding in which diffusion of atoms occurring on the joint surface is utilized via a melted insert metal, and a reactive bonding using a boundary reaction between the base materials.

The solid-solid bonding includes a diffusion bonding using diffusion of atoms occurring on the joint surface between the base materials, a solid phase diffusion bonding in which using diffusion of atoms occurring on the joint surface via a solid insert metal, and an ultrasonic bonding in which ultrasonic vibration is applied between the base materials.

By using the metal material bonding, it is unnecessary to excessively press the base materials so that strength of the base material for the lead wires 6 can be secured. Note that the base material strength of the lead wire 6 is defined as a strength of the lead wire 6 itself. The base material strength of the lead wire 6 is lowered when an amount of force exerted on the lead wire 6 is large or when the material is degrading. The lower base material strength may cause cracks or the like on the lead wire 6.

[Mechanical Fastening]

Also, the lead wiring 6 and the terminal 32 can be fastened by using a mechanical fastening in which materials are fastened to each other, or using a mechanical fastening in which metal material other than these materials are fastened to each other. The mechanical fastening between the lead wire 6 and the terminal 32 includes cold caulking in which at least one material is deformed to caulk them to each other, and a rivet connection using a rivet, and a screw joining using a screw for fastening.

Cold caulking can be performed such that an insertion hole is formed in the terminal 32 and an end portion of the lead wire 6 is inserted into the insertion hole, thereby fastening the lead wire 6 and the terminal 32. When using a rivet or screw to fasten the lead wire 6 and the terminal 32, the end portion of the lead wire 6 is pressed so as to flatten the end portion, whereby the flattened end portion and the terminal 32 can be fastened.

When performing the metal material bonding, material may be degraded at a localized portion, since the base material is locally heated. To avoid degradation of the material, mechanical fastening can be utilized instead of using metal material bonding. Also, when metal material bonding is not available, mechanical fastening can be performed.

When mechanical fastening is performed, a bonding strength between the lead wire 6 and the terminal 32 can be secured. Here, the bonding strength is defined as a strength of a bonded portion between the lead wire 6 and the terminal 32. The bonding strength may be lowered due to poor integrity of the materials or small bonding force. When the bonding strength is lowered, peeling may occur between the lead wire 6 and the terminal 32.

[Combination of Metal Material Bonding and Mechanical Fastening]

The lead wire 6 and the terminal 32 can be connected using the above-described metal material bonding and the above-described mechanical fastening. In the case where necessary bonding strength between the lead wire 6 and the terminal 32 cannot be secured, both of the metal material bonding and the mechanical fastening can be used.

In this case, even when the base material strength is lowered, by combining the metal material bonding and the mechanical fastening, the bonding strength between the lead wire 6 and the terminal 32 can be secured. Especially, the temperature sensor 1 is used in an environment of strong vibration, both of the metal material bonding and the mechanical fastening can be used.

Also, a fusing as a heat caulking can be categorized as a case where the metal material bonding and the mechanical fastening. The fusing is used for a bonding in which current is controlled to flow through the lead wire 6 and the terminal 32, and welding pressure is applied to the end portions of the lead wire 6 and the terminal 32 to be deformed, thereby being bonded to each other. The fusing can be categorized as a solid-solid phase bonding. However, since a mechanical bonding strength is also obtained from the fusing, where concave-convex (unevenness) formed on at least one joint surface of the lead wire 6 and the terminal 32 bites into the other joint surface, or they are sandwiched, the fusing is categorized as a case where both of the metal material bonding and mechanical fastening are combined. The lead wire 6 and the terminal 32 are bonded by the fusing, whereby sufficient bonding strength can be secured.

Other configurations, effects and advantages in the temperature sensor according to the present embodiment are the same as those of the first embodiment. Also in the present embodiment, elements having the same reference numbers as the first embodiment are the same as the elements shown in the first embodiment.

The present disclosure is not limited to the above-described embodiments. However, further different embodiments can be configured without departing from the split of the present disclosure. The present disclosure includes various modification examples, and equivalents thereof.

What is claimed is:

1. A temperature sensor comprising:
a housing;
a connector disposed in a base end side of the housing;
a cover attached to a tip end side of the housing;
a temperature sensing part disposed in a tip end portion in the cover, detecting temperature;
a pair of lead wires having conductivity, connected to the temperature sensing part and a terminal of the connector;
a guide tube having insulation properties, formed to have a larger inner diameter than an outer diameter of each lead wire, the guide tube having a gap between each lead wire and the guide tube to cover each lead wire;
a filler that directly or indirectly touches the temperature sensing part and a tip end of the guide tube, a tip end region inside the cover being filled with the filler; and
a space formed within the cover extending from the tip end region inside the cover being filled with the filler to a housing side of the cover in a longitudinal direction of the temperature sensor; wherein
the temperature sensing part and a tip end of the paid of lead wires are covered by a sealing glass; and
the sealing glass is covered by a protective film.

2. The temperature sensor according to claim 1, wherein
the lead wire extending from a tip end opening of the guide tube, a gap between a tip end opening of the guide tube and the lead wire are covered by the protective film;
a linear expansion coefficient of the protective film is smaller than that of the lead wire and larger than that of the filler; and
the filler touches the protective film and a tip end of the guide tube.

3. The temperature sensor according to claim 2, wherein
a clearance is formed between an inner surface of a tip bottom end of the cover and the protective film; and
the clearance is filled with the filler.

4. The temperature sensor according to claim 1, wherein
the temperature sensing part, the lead wire extending from a tip end opening of the guide tube, a gap between a tip end opening of the guide tube and the lead wire are covered by the protective film;
a linear expansion coefficient of the protective film is smaller than that of the lead wire and larger than that of the filler; and
the filler touches the protective film and a tip end of the guide tube.

5. The temperature sensor according to claim 1, wherein
a clearance is formed between an inner surface of a tip bottom end of the cover and the temperature sensing part; and
the clearance is filled with the filler.

6. The temperature sensor according to claim 1, wherein
a gap between base ends of the pair of lead wires disposed in the housing is larger than a gap between tip ends disposed at least in the cover; and
the guide tube covers at least the tip ends of the pair of lead wires.

7. The temperature sensor according to claim 1, wherein
the temperature sensing part is configured as a thermistor or a temperature measurement resistance element in which electrical resistance changes in response to an increase in temperature.

8. The temperature sensor according to claim 1, wherein
the temperature sensing part is configured as a temperature measuring junction of a thermocouple that utilizes thermoelectromotive force produced between a pair of contacts based on a temperature difference therebetween.

9. The temperature sensor according to claim 1, wherein
the pair of lead wires and the terminal of the connector are bonded with metal material bonding in which base materials thereof are bonded to each other, or metal material bonding using metal material other than the base materials.

10. The temperature sensor according to claim 1, wherein
the pair of lead wirings and the terminal of the connector are fastened by using mechanical fastening in which materials are fastened to each other, or using a mechanical fastening in which metal material other than these materials are fastened to each other.

11. The temperature sensor according to claim 1, wherein
the pair of lead wires and the terminal of the connector are connected with a combination of metal material bonding in which base materials thereof are bonded to each other or metal material bonding using metal material other than the base materials, and mechanical fastening to fasten these materials to each other or mechanical fastening in which metal material other than these materials are fastened to each other.

12. The temperature sensor according to claim 1, wherein
each of the lead wires includes a tip end, a base end, and a slope portion formed between the tip end and the base end,
the tip end and the base end of each of the lead wires extend parallel to an axial direction of the housing, and the slope portion is inclined with respect to the axial direction of the housing,
the guide tube covers at least a part of each of the tip end, the base end and the slope portion of each of the lead wires.

13. The temperature sensor according to claim 1, wherein
an inner diameter of the guide tube is 1.2 to 2.0 times as much as an outer diameter of the lead wires.

14. The temperature sensor according to claim 1, wherein
a natural frequency of the guide tube differs from a natural frequency of the lead wires.

15. The temperature sensor according to claim 1, wherein
the guide tube is configured to prevent resonance in the guide tube triggered by resonance of the lead wires.

* * * * *